United States Patent [19]
Smith et al.

[11] Patent Number: 5,738,898
[45] Date of Patent: *Apr. 14, 1998

[54] PROCESS FOR REDUCING STEROLS IN EGGS

[75] Inventors: Denise M. Smith, DeWitt; Aziz Awad, Westland, both of Mich.; Christopher Sikorski, Whiting, Ind.; Wen Shieh; Allan Hedges, both of Crown Point, Ind.

[73] Assignee: Board of Trustees operating Michigan State University, East Lansing, Mich.

[*] Notice: The term of this patent shall not extend beyond the expiration date of Pat. No. 5,484,624.

[21] Appl. No.: 512,364

[22] Filed: Aug. 8, 1995

Related U.S. Application Data

[63] Continuation-in-part of Ser. No. 414,800, Mar. 31, 1995, Pat. No. 5,484,624.

[51] Int. Cl.$^6$ ........................................ A23L 1/32
[52] U.S. Cl. ............................... 426/614; 426/422
[58] Field of Search .......................... 426/614, 422, 426/480, 425, 47

[56] References Cited

U.S. PATENT DOCUMENTS

| | | |
|---|---|---|
| 3,076,715 | 2/1963 | Greenfield . |
| 3,563,765 | 2/1971 | Melnick . |
| 4,103,040 | 7/1978 | Friorit . |
| 4,880,573 | 11/1989 | Courregelongue . |
| 4,980,180 | 12/1990 | Cully . |
| 5,037,661 | 8/1991 | Merchent . |
| 5,063,077 | 11/1991 | Vollbrecht . |
| 5,223,295 | 6/1993 | Maffrand . |
| 5,232,725 | 8/1993 | Roderbourg . |
| 5,292,546 | 3/1994 | Cully . |

FOREIGN PATENT DOCUMENTS

| | | |
|---|---|---|
| 2035156 | of 1991 | Canada . |
| 2050031 | of 1992 | Canada . |
| 0326469 | of 1989 | European Pat. Off. . |
| 9111114 | of 1991 | WIPO . |
| 9324022 | of 1993 | WIPO . |

OTHER PUBLICATIONS

Woodward, S.A., et al., J. Food Sci. 48:501 (1983).
Causeret, D., et al., J. Food Sci. 56:1532–1536 (1991).
Seidman, W.E., et al., Poultry Sci. 43:406–417 (1962).
Gill, J.L., Design and Analysis of Experiments in the animal and Medical Sciences. Iowa State Univ. Press, Ames, Iowa (1978).
Burley, R.W., et al., Can. J. Biochem. Physiol. 39:1295–1307 (1961).
Dehal, S.S. et al., A Novel method to Decrease the Cholesterol Content of Foods, Fat and Cholesterol Reduced Foods (1991).
Szejtli, J., Industrial applications of cyclodextrins. Inclusion Compound 3:331–390 (1984).
Fletcher, D.L., et al., Poultry Sci. 63:1759–1763 (1984).
Adams, L.M., et al., J. Assoc. Off. Anal. Chem. 66: 844–846 (1986).
Monahan, et al., J. Agric. Food Chem. 40:1310 (1992).
Norris, M.E., et al., Appendix II in Recommended Methods for Analysis of Eggs and Poultry Meat, North Central Regional Research Publication #307 (1986).
Froning, GW et al., J. Food Sci. 55:95–98 (1990).
Singer, NS et al., Paper No. 63, presented at the 53rd Annual Meeting of Inst. of Food Technologists, Chicago, Illinois, Aug. 8–15, (1993).

*Primary Examiner*—Anthony J. Weier
*Attorney, Agent, or Firm*—Bierman, Muserlian and Lucas

[57] ABSTRACT

Cyclodextrin, a base and water are mixed with egg yolk to reduce the cholesterol content of the egg yolk. The cholesterol is removed as a complex of cyclodextrin while the base prevents loss of protein from the egg yolk. The amount of base added is sufficient to adjust the pH to between 7.5 and 12.

20 Claims, 3 Drawing Sheets

PROCESS FOR REDUCING STEROLS IN EGGS

This is a continuation-in-part of U.S. patent application Ser. No. 08/414,800 filed Mar. 31, 1995 now U.S. Pat. No. 5,484,624 issued Jan. 16, 1996.

This invention relates to a process for reducing sterols, especially cholesterol, in eggs.

Studies have linked sterols and, especially, cholesterol with increased rates of heart disease and certain types of cancer. As a result of these findings, there was been a demand by consumers and the food industry for reduced cholesterol foods. For example, chicken eggs have fallen into disfavor among consumers due to their high cholesterol content. Cholesterol is located in the yolk of an egg, and reduction of the cholesterol content in the yolk should improve consumer perception of eggs.

It is known that sterols such as cholesterol will form complexes with cyclodextrin and that such complexes will form when cyclodextrin is mixed with egg yolks in the presence of water. It is also known that these complexes can be separated from the egg yolk by centrifugation, thereby reducing the cholesterol/sterol content of the egg yolk, see for example U.S. Pat. Nos. 5,063,077; 5,223,295; and 5,292,546.

U.S. Pat. No. 5,223,295 teaches that water is mixed with the egg or egg yolk, and then, cyclodextrin is mixed with the water and egg/egg yolk. After mixing for a period of time the complex is removed and a reduced cholesterol egg/egg yolk is obtained. A problem associated with this process is that a significant portion of the protein in the egg yolk is also removed when the complex is separated from the yolk. This loss of protein yields an overall loss in the amount of egg yolk recovered after treatment, thereby, reducing the economic viability of the process.

U.S. Pat. No. 5,063,077 teaches separating the protein from the egg yolk prior to treating the egg yolk with cyclodextrin. After the complex has been removed, the protein is resuspended in the egg yolk. A disadvantage to this approach is that the separated protein contains a significant quantity of cholesterol. Resuspending the protein in the treated egg yolk increases the cholesterol content of the treated egg yolk, thus thwarting the whole purpose of the cyclodextrin treatment.

U.S. Pat. No. 5,292,546 teaches adding an aqueous solution of sodium chloride or ammonium carbonate to the yolk prior to adding the cyclodextrin to the egg yolk; and then subsequently removing the sodium chloride or ammonium carbonate. The disadvantage to this approach is that the salt and ammonium adversely affect the flavor profile of the egg yolk. Furthermore, salt has fallen into disfavor because of its link to high blood pressure. Removal of the salt from the egg yolk is costly; and a removal step, such as electrodialysis, affects the shelf life of the egg product by allowing additional time for microbial growth.

There is a need for a simple process for reducing sterols like cholesterol from eggs. Such a process should have a short treatment time and have minimal effect on the flavor profile and shelf life of the yolk.

A process has now been discovered which uses cyclodextrin to reduce sterols such as cholesterol from eggs without substantial loss of protein from the egg, and without the need to separate the egg yolk from the egg or the protein from the egg yolk. The process of the present invention provides an economic advantage to the user because the treatment time is short and the treatment can employ a low shear or mixing rate while still obtaining good results.

The process of the present invention employs a food grade base to adjust the pH of the egg to between about 7.5 and 12 coupled with cyclodextrin in the presence of water to remove sterols like cholesterol from the egg yolk. Additionally, it has been found that a low shear rate can be employed to mix the cyclodextrin and base with the egg yolk. Furthermore, it has been found that after a relatively short time, about 1 to about 10 minutes, a sufficient amount of sterols have complexed with cyclodextrin such that the sterol content of the egg has been substantially reduced. After removal of the complex from the egg, the pH of the egg yolk is adjusted back to normal, 6 to 7, by the addition of a food grade acid. These pH adjustments have been found to have little or no effect on the flavor profile or the shelf life of the treated egg.

The terms sterol and cholesterol as used in the specification and claims mean not only sterols and cholesterol per se but also their esters.

Any bird egg can be treated in accordance with the present invention, for example, ostrich, chicken, pigeon, duck, goose or turkey. Chicken eggs are the most common in the market place today.

Figure 1:
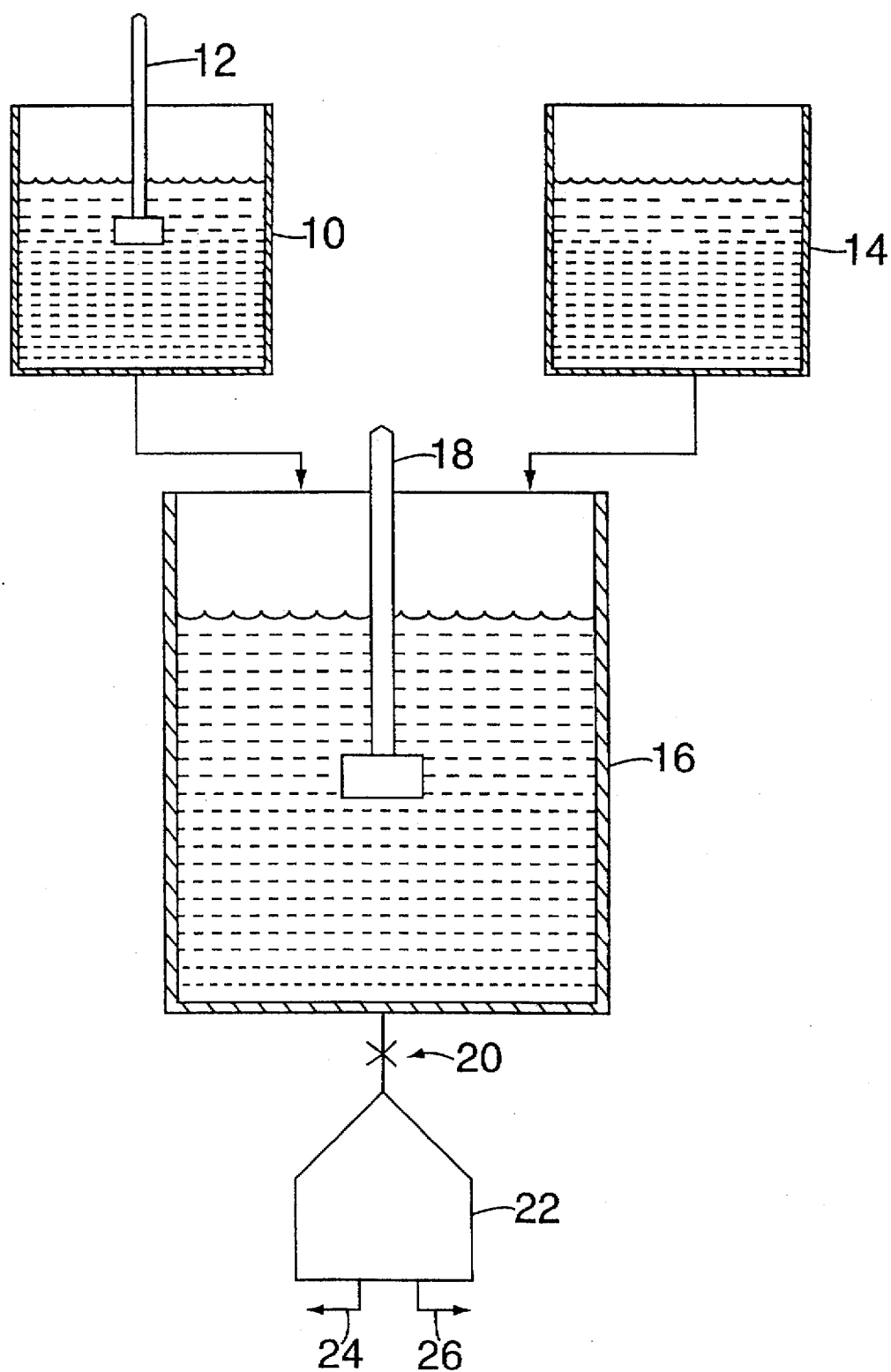
FIG. 1 illustrates the process of the present invention in a preferred batch mode.

Broadly, the process of the present invention comprises the steps of:

(a) forming a uniform liquid mixture comprising water, a food grade base, cyclodextrin, and egg yolk, at a temperature of about 20° C. to about 60° C., said food grade base being present in an amount sufficient to adjust the pH of said mixture to between about 7.5 and 12, said cyclodextrin being present in an amount of about 10% to about 30% by weight of water, said mixture having a water to egg yolk weight ratio of about 0.7:1 to about 2:1, such that complexes form between the sterol and the cyclodextrins;

(b) separating said complexes from said mixture;

(c) adjusting the pH of said mixture with a food grade acid to about 6 to about 7; and (d) recovering an egg yolk with reduced sterol.

Suitable food grade bases for use in the present invention are alkali metal cation containing food grade bases. Specifically, food grade bases that contain the alkali metal cation of sodium or potassium are preferred for use in the present invention. More specifically, suitable alkali metal cation containing food grade bases include sodium hydroxide, potassium hydroxide, sodium carbonate and potassium carbonate. It is preferred to use a food grade base which does not contain sodium because of the link between sodium and high blood pressure. Thus, potassium hydroxide and potassium carbonate are most preferred for use in the present invention. Good results have been obtained with potassium hydroxide.

The amount of food grade base used in the process of the present invention is enough to adjust the pH of the mixture to between about 7.5 and 12 and more preferably to about 8.5 to 10.5. Good results have been obtained with a pH of about 9 to 10. The pH of the solution is determined in a conventional manner using conventional equipment such as a pH meter. When using potassium hydroxide, the amount of base in solution should be about 0.5% to about 0.75% by weight water, and more preferably about 0.6% to about 0.7% by weight water.

The temperature is maintained throughout the process at preferably about 20° C. to about 60° C. and more preferably about 55° C.

Alpha-, beta-, gamma-cyclodextrin, or a mixture thereof, modified cyclodextrin or a branched cyclodextrin can be used in the present invention. Preferably, beta-cyclodextrin is used.

The amount of cyclodextrin used in the mixture is about 5% to about 30% by weight water and more preferably about 10% to about 15% by weight water.

The weight ratio of water to egg yolk in the mixture is about 0.7:1 to about 2:1 and more preferably about 1:1. Reference is made to treating egg yolk, however the egg yolk may be in the form of egg yolk separated from the white or may be in the form of a whole egg, i.e. yolk and white together. Good results have been obtained with egg yolk separated from the egg white. Reference is made in the specification and claims to removing the cholesterol from egg yolks because the cholesterol is contained in the yolk of the egg and not the white.

Between forming the uniform mixture and separating the complexes from the mixture it may be advantageous to employ an intermediate step of maintaining the uniformity of the mixture. Preferably the temperature of the mixture is also maintained in this intermediate step. The mixture can be maintained in its uniform condition for about 1 to about 60 minutes to allow complexation to continue to take place; and more preferably for about 5 to 10 minutes. Complexation starts immediately upon mixing, however, some time may be needed to obtain a commercially reasonable reduction in cholesterol.

Any food grade acid can be used to adjust the pH to about 6 to about 7 so long as it doesn't adversely effect the color and flavor of the egg. Suitable acids include citric, phosphoric, tartaric and acetic. Citric acid is preferred because it has no effect on the color of the egg yolk. Preferably, 0.1 molar citric acid is used to adjust the pH of the solution to about 6 to about 7 after separation of the complex from the solution.

More preferably, the uniform liquid mixture is formed in a plurality of steps, those steps being:

(a1) forming a mixture comprising water, a food grade base, and cyclodextrin;

(a2) heating said mixture to a temperature of about 20° C. to about 60° C.;

(a3) heating egg yolk to about 20° C. to about 60° C.;

(a4) mixing said heated egg yolk and said heated solution to form a uniform mixture having a water to egg yolk weight ratio of about 0.7:1 to about 2:1, a pH of between about 7.5 and 12 and a cyclodextrin content of about 10% to about 30% by weight water.

Furthermore, it is preferred that the water, cyclodextrin and base solution be heated to a temperature of about 55° C. and that the egg yolk be heated to a temperature of about 55° C. prior to forming the mixture. It is also preferred that the solution have a water to egg yolk weight ratio of about 1:1 and a pH of about 8.5 to about 10.5.

Preparing the solution, forming the mixture and maintaining the uniformity of the mixture (optional step) are done in a conventional manner using conventional equipment. For example, a tank or tanks equipped with impellers can be used for each step of the process. Alternatively, tanks equipped with impellers can be used to heat the egg yolk and form the solution of cyclodextrin, water and food grade base, then the two are pumped together through a conduit wherein the step of forming a uniform mixture is accomplished through the union of the two solutions in a mixing means such as a Y adapter, a homogenizer, a large volume pump or a tank with an impeller, and the step of maintaining the uniformity of the mixture, if necessary, is done by means of the flow characteristics of the mixture in the conduit and with pumps in the pipes used to move the mixture through the pipes. As will be noted below, using low shear to form the mixture has produced certain advantages. Specifically, low shear helps to avoid a loss of egg yolk components from the treated egg yolk. It is preferred that the mixture be formed at a low shear rate.

The mixture is uniform when the mixture has a uniform color and is substantially uniform in chemical composition. This means that the cyclodextrin, base and water are uniformly distributed with the egg yolk. It is presumed that an emulsion forms wherein the cyclodextrin stays in the water phase and the cholesterol stays in the egg yolk phase until it complexes with the cyclodextrins. The complex remains in the water phase of the emulsion. The complex forms an insoluble precipitate which can be separated from the water and egg yolk.

The emulsion formed by mixing all the components together has been found to be extremely stable. Little or no agitation is necessary to maintain the emulsion. For complexation, the emulsion must remain intact, i.e. the mixture must remain as a uniform mixture.

The base can be added to the mixture any time prior to centrifugation. It has been found that it is the centrifugation which causes the loss of the protein from the egg yolk. Thus, so long as the base is added and uniformly dispensed in the mixture prior to centrifugation the protein will be maintained in the egg yolk. Addition of water to the egg yolk in the absence of the base causes the protein to be precipitated out of the mixture. This precipitation is a reversible process and the base causes the protein to go back into the solution if the base is added to the mixture after the protein has precipitated. It is preferred to add the base to the water prior to combining the water with the egg yolk. In other words, the water should be basic before it is added to the egg yolk to avoid the precipitation of the protein.

Separation of the complexes from the mixture is done in a conventional manner using conventional equipment. A centrifuge has yielded good results.

There may be residual cyclodextrin in the egg yolk after removal of the complex from solution. This residual cyclodextrin comes from uncomplexed and complexed cyclodextrin which remained with the egg yolk after separation of the cyclodextrin-cholesterol complex from the yolk. Preferably, the residual cyclodextrin is removed from solution by treating the recovered egg yolk with an immobilized alpha amylase enzyme and/or a combination of alpha amylase and cyclodextrin glucosyltransferase at a temperature of about 50° C. for a period of about 30 minutes in the presence of water. The weight ratio of recovered egg yolk to enzyme should be about 10:1 to about 2:1 to reduce residual cyclodextrin in said recovered egg yolk. The weight ratio of water to egg yolk should be about 0.7:1 to about 2:1; and more preferably about 1:1. The egg yolk recovered after treatment with the enzyme has been found to be substantially free of residual cyclodextrin.

In order to obtain a suitable end product, the water is removed from the egg yolk in a conventional manner using conventional equipment. Evaporation of the egg yolk to obtain the proper solid levels has produced good results.

After the complex has been separated from the egg yolk, it is preferable that the complex be further processed to break the complex and recover the cyclodextrin. The recovered cyclodextrin is subsequently recycled. To recover the cyclodextrin, the complex is suspended in water such that the weight ratio of water to complex is about 99:1 to about 4:1. The suspended complex is then agitated and heated to a temperature of about 90° C. to about 100° C. for a period of about 5 to about 30 minutes. This causes the cyclodextrin to separate from the complex; subsequently, the cyclodextrin is recovered. More preferably, the suspended complex is heated to about 95° C. and the weight ratio of water to complex in the suspension is about 9:1. The recovery of the cyclodextrin is done using conventional equipment.

The process of the present invention can be carried out in a batch operation, such as by using a tank equipped with an impeller into which heated egg yolk and a heated solution of water, base and cyclodextrin are added and mixed to form the uniform mixture. Alternatively, the process is carried out in a pipeline such that a heated solution of egg yolk is pumped from a first tank to join with a heated solution of water, cyclodextrin and base from a second tank. The two solutions are joined in a mixing means and then pumped through a pipe to a centrifuge to separate the water and complex from the egg yolk.

As shown in FIG. 1, the process of the present invention can be carried out batch-wise. Tank 10 contains a solution of beta-cyclodextrin, base and water. Tank 10 is equipped with a heating means such as a water jacket for heating the contents. Tank 10 is also equipped with impeller 12 to maintain the uniformity of the solution. Tank 14 contains egg yolks and is also equipped with a heating means such as a water jacket to heat the contents.

The contents of tank 10 and tank 14 are pumped or drained into tank 16 which is equipped with an impeller 18 to form the uniform liquid mixture and to maintain the uniformity of the mixture, if necessary. Tank 16 is also equipped with a heating means such as a water jacket to maintain the temperature of the mixture. After a period of time, about 1 to about 60 minutes, the contents of tank 16 are drained through the drain cock 20 and centrifugal separating apparatus 22 separates the mixture into complex cyclodextrin paste 24 and egg yolk 26. The paste phase is then subject to a decomplexation step and recycling of the beta-cyclodextrin to tank 10 while the egg is subject to a removal of residual cyclodextrin by an enzyme and evaporation step (not shown).

Figure 2:
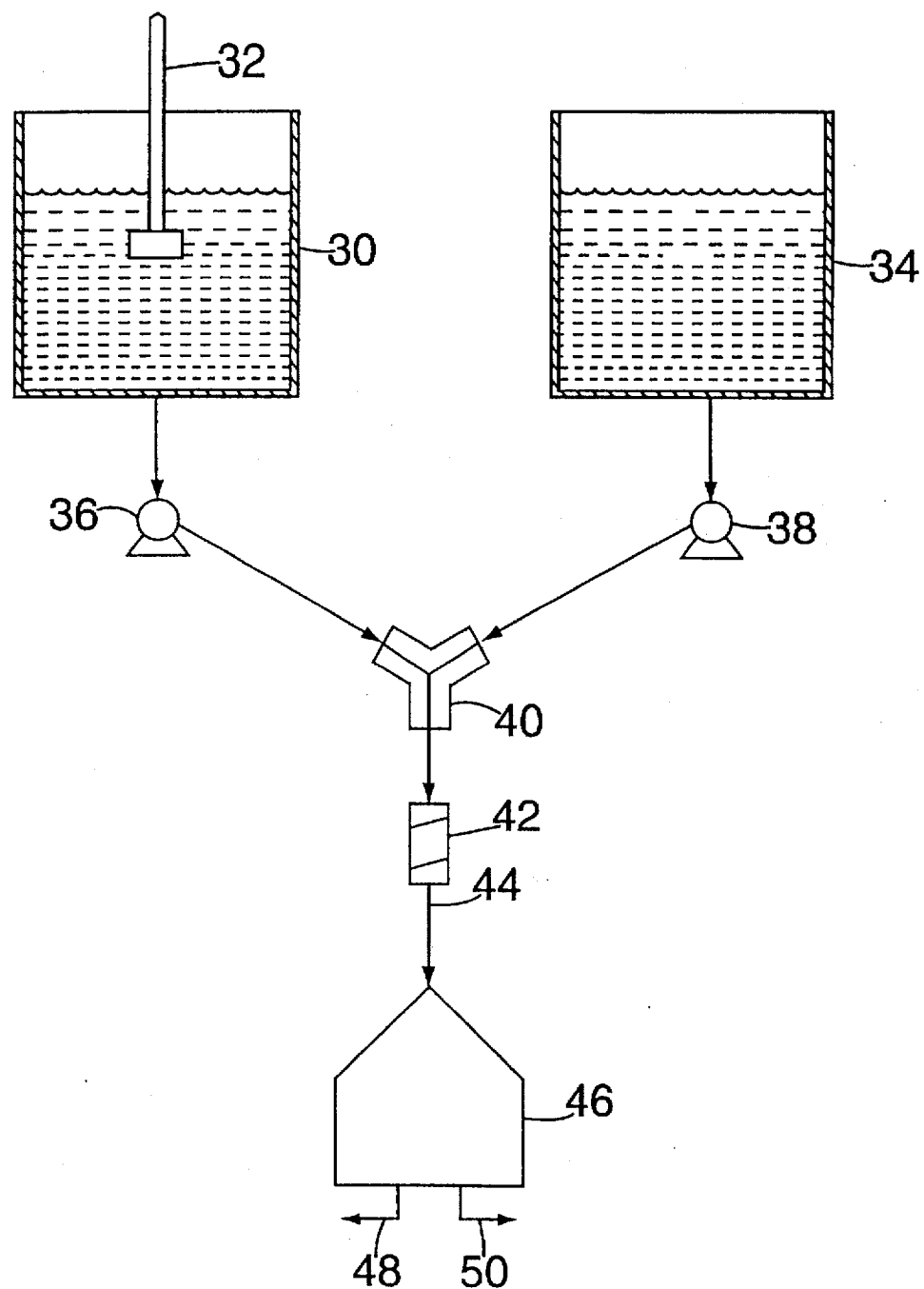
FIG. 2 illustrates the process of the present invention in a preferred continuous mode.

As shown in FIG. 2, tank 30 has an impeller 32 and contains a solution of water, base and beta-cyclodextrin. Impeller 32 maintains the uniformity of the solution. Tank 30 is equipped with a heating means, such as a water jacket, to heat the contents of tank 30. Tank 34 contains egg yolk and is also equipped with a heating means such as a water jacket to heat the contents of the tank. Pumps 36 and 38 are variable speed pumps which draw the contents of tank 30 and 34, respectively, and pump them to a mixing means which for purposes of illustration is depicted as Y adapter 40. Pumps 36 and 38 are adjusted to provide the proper ratio of egg yolk to water.

At Y adapter 40 the egg yolk and basic beta-cyclodextrin solution are mixed. Alternatively, in-line mixer 42 is also positioned just after Y adapter 40.

The mixture then passes through pipeline 44 to centrifugal separating apparatus 46. The length of pipeline 44 is such that the mixture can be maintained for about 1 to about 60 minutes. Since the emulsion is so stable, there is no need for additional in-line mixers, however additional in-line mixers may be employed. Further, additional pumps may be necessary to move the mixture through the pipeline. The action of these additional pumps on the mixture provides enough additional mixing to maintain the uniformity of the mixture, if necessary. The mixture, after moving through pipeline 44, goes to centrifugal separating apparatus 46 which separates the mixture into a cyclodextrin-complex paste 48 and egg yolk 50. The paste phase is subject to a decomplexation step and a recycling of the beta-cyclodextrin to tank 30 while the egg yolk is subject to a removal of residual cyclodextrin by enzyme and an evaporation step (not shown).

Figure 3:
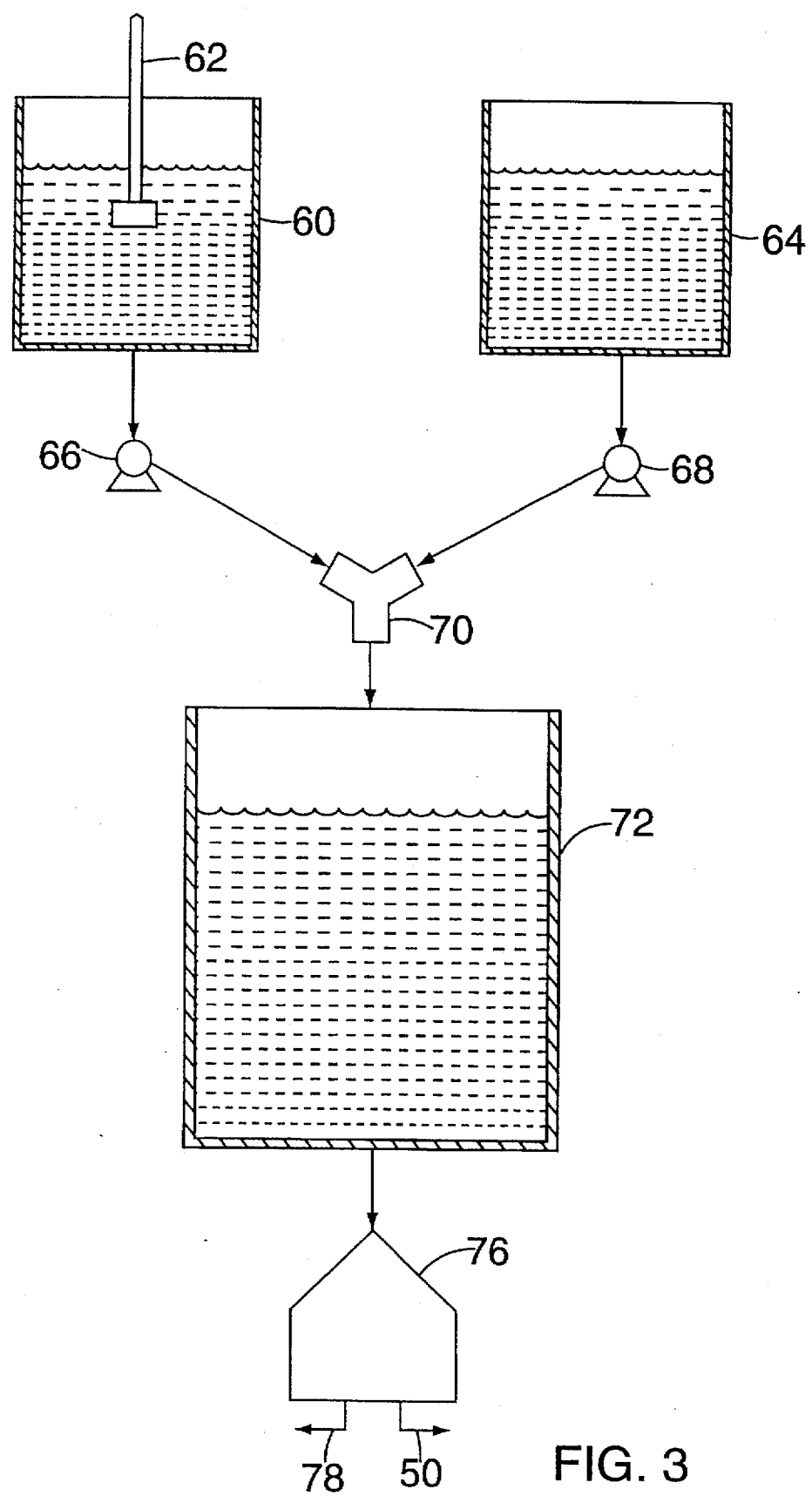
FIG. 3 illustrates another preferred embodiment of the present invention.

As shown in FIG. 3 tank 60 contains an aqueous solution of beta-cyclodextrin and base. The contents of tank 60 are stirred by paddle 62 to maintain its uniformity and heated by means of a water jacket. Tank 64 contains egg yolks which have been separated from the whites and which have been heated by means of a water jacket.

Using two liquid pumps, pump 66 and pump 68 with variable speed adjustment to control flow of the liquid, the contents of each tank are pumped to a mixing means, which is depicted as Y adapter 70. Pumps 66 and 68 are adjusted to provide an appropriate water to egg yolk weight ratio and pH. At Y adapter 70 the two liquids are mixed and an emulsion is formed. From Y adapter 70 the mixture passes through a short length of piping and flows into container 72. The mixture is held in container 72 for 10 minutes to 1 hour. In container 72, the temperature of the mixture is maintained with a water jacket. Eventually, the emulsion is drawn off of tank 72 and subjected to a centrifuge 76 to separate the complex 78 from the egg yolk 80.

The time between forming the mixture and dumping the mixture into holding tank 72 is essentially instantaneous. The formation of complexes between the cholesterol and cyclodextrin occurs virtually instantaneously upon mixing the cyclodextrin and egg yolk together in an aqueous environment. The holding tank is used primarily to provide some flexibility in the operation.

These and other aspects of the present invention may be more fully understood by reference to one or more of the following examples.

EXAMPLE 1

This example illustrates the loss of egg yolk during separation of the cholesterol-cyclodextrin complex using beta-cyclodextrin without a food grade base.

An aqueous solution of beta-cyclodextrin at 30% solids was prepared and then mixed with egg yolk. The water to egg yolk weight ratio was 1:1. The mixture was at ambient temperature. After about 5 to 10 minutes, a sample was collected and centrifuged at 10,000 r.p.m. for fifteen (15) minutes at 40° C. The supernatant was collected and tested for cholesterol reduction and percent weight loss. It was found that the cholesterol was reduced by 90% and that 52% by weight of the yolk was lost.

Thus, although most of the cholesterol was removed from the yolk, approximately half of the egg yolk was lost in this process.

EXAMPLE 2

This example illustrates the addition of sodium chloride to the process of Example 1.

An aqueous suspension was prepared having a 6:3:1 weight ratio of water:beta-cyclodextrin:sodium chloride. This suspension was then mixed with egg yolk to form a mixture and maintained as such for 5 to 10 minutes. The cholesterol reduction was 83% and 45% of the yolk was lost.

EXAMPLE 3

This example illustrates the present invention wherein potassium hydroxide is used to raise the pH of the system to 9.7.

An aqueous suspension was prepared containing a 1:1 weight ratio of yolk:water and 12% beta-cyclodextrin by Weight water. The water contained potassium hydroxide (KOH) at a level of 1.67 grams per 250 grams of water (0.7%). The water and yolk were separately pre-heated to 50° C. prior to mixing. The mixture was mixed at 1200 r.p.m. for 1 minute in a tank equipped with an impeller and then the mixture was passed through a pipeline equipped with a homogenizer. This pressure through the homogenizer was varied and the number of times through the homogenizer was also varied. Each mixture was centrifuged at 10,000 r.p.m. for 15 minutes at 40° C. to separate the complex from the egg yolk. The supernatant is collected as product.

TABLE I

| Homogenization Conditions | Cholesterol Reduction | Weight Lost |
| --- | --- | --- |
| Pre-homogenized | 78% | N.M. |
| 100 kg/cm2; 1st Pass | 72% | 15% |
| 200 kg/cm2; 1st Pass | 74% | 14% |
| 200 kg/cm2; 2nd Pass | 76% | 13% |
| 200 kg/cm2; 3rd Pass | 76% | 12% |
| 400 kg/cm2; 1st Pass | 75% | 13% |
| 400 kg/cm2; 1st Pass | 74% | 13% |

As can be seen, the cholesterol reduction was about 75% with weight loss of no more than 15%. As can be seen, the number of passes through the homogenizer and the pressure appears to have no effect on either cholesterol reduction or weight loss.

EXAMPLE 4

This example illustrates the loss of egg yolk using the procedure and apparatus of Example 3, without the addition of a base. Samples were tested and the test results are reported in Table II below.

TABLE II

| Homogenization Conditions | Cholesterol Reduction | Weight Lost |
| --- | --- | --- |
| Pre-homogenized | 72% | 31% |
| 1st Pass; No Pressure | 83% | 32% |

As can be seen, weight loss was higher than in Example 3, but not as high as in Example 1 above. Less beta cyclodextrin is used in this example relative to Example 1 above (12% AQ vs 30% AQ). Using less beta cyclodextrin gives acceptable cholesterol reduction, but still results in an unacceptable weight loss.

EXAMPLE 5

This example illustrates using the process of the present invention in a batch operation using equipment similar to that shown in FIG. 1.

In this Example, an aqueous slurry containing 12% by weight water of beta-cyclodextrin and 0.7% KOH by weight water was mixed with egg yolk to obtain a mixture having a pH of 9.7 and a water to egg yolk weight ratio of 1:1. A number of such mixtures were prepared in a tank equipped with an impeller. Both the temperature and the rate of mixing was varied. Each mix was stirred for 5 minutes. The results of each mixture are listed below:

TABLE III

| Stir Rate | Temperature °C. | Cholesterol Reduction | Weight Lost |
| --- | --- | --- | --- |
| 400 r.p.m | 20° | 81% | 22% |
| 400 r.p.m | 50° | 74% | 18% |
| 800 r.p.m | 20° | 77% | 27% |
| 800 r.p.m | 50° | 75% | 17% |
| 1200 r.p.m | 20° | 68% | 25% |
| 1200 r.p.m | 50° | 77% | 18% |

As can be seen here lower mixing speeds also yield acceptable levels of cholesterol reduction. In addition it is clear that performing the experiment at an elevated temperature results in decreased weight loss.

EXAMPLE 6

This example illustrates that using 10% or less of beta-cyclodextrin by weight water does not yield good results.

The procedure of Example 5 was run using a 1200 r.p.m. mixing speed at 20° C. The amount of beta-cyclodextrin used in each batch as well as the weight loss of yolk and cholesterol reduction are reported in Table VI, below.

TABLE VI

| BCD Amount | Cholesterol Reduction | Weight Lost |
| --- | --- | --- |
| 3% | 13% | 8% |
| 5% | 15% | 12% |
| 7% | 15% | 11% |
| 8% | 22% | 10% |
| 9% | 34% | 14% |
| 10% | 39% | N.D. |
| 12% | 68% | 25% |

As can be seen, using less than 10% cyclodextrin does not provide a commercially viable reduction in cholesterol content of the yolk.

EXAMPLE 7

This example illustrates using an arrangement similar to the one shown in FIG. 3 to decholesterize egg yolk.

Tank 60 contained 250 ml. of a 12% by weight beta-cyclodextrin aqueous solution into which 1.67 grams of potassium hydroxide had been added. The contents of tank 60 were stirred to maintain their uniformity and heated to 55° C. Tank 64 contained egg yolks which had been separated from the whites and which had been heated to 55° C.

Using two conventional liquid pumps, pump 66 and pump 68 with variable speed adjustment to control flow of the liquid, the contents of each tank were pumped to Y adapter 70. Pumps 66 and 68 were adjusted to provide a water to egg yolk weight ratio of 1:1 and a pH in the resulting mixture of about 9.7. At Y adapter 70 the two liquids were mixed and the mixture formed. From Y adapter 70 the mixture passed through approximately six inches of 0.75 inch (ID) piping at a flow rate of 150 ml. per minute and into a container. After the mixture was formed it was held in container 72 for 5 to 10 minutes and then subjected to a centrifuge 76 to separate the complex from the egg yolk. No in-line mixer or pipe line was used. The resulting egg yolk was then tested for both weight loss and cholesterol reduction. The weight loss was 13% and the cholesterol reduction was 75%.

EXAMPLE 8

This example illustrates that increasing the mixing time does not increase the cholesterol reduction or decrease the weight loss and that formation of the complexes is virtually instantaneous.

The apparatus in accordance with FIG. 2 was employed along with an in-line mixer 42. Tank 30 contained 250 ml. of a 12% by weight beta-cyclodextrin aqueous solution into which 1.67 grams of potassium hydroxide had been added. The contents of tank 30 were stirred to maintain their uniformity and heated to 55° C. Tank 34 contained egg yolks which had been separated from the whites and which had been heated to 55° C.

Using two conventional liquid pumps, pump 36 and pump 38 with variable speed adjustment to control flow of the liquid, the contents of each tank were pumped to Y adapter 40. Pumps 36 and 38 were adjusted to provide a water to egg yolk weight ratio of 1:1 and a pH in the resulting mixture of about 9.7. At Y adapter 40 the two liquids were mixed and the mixture formed. From Y adapter 40 the mixture passed through approximately six inches of 0.75 inch (ID) piping at a flow rate of 150 ml. per minute and into in-line mixer 42. In-line mixer 42 had a length of 11 inches and internal diameter of 7/16 inch. The total time for both mixing and collecting was approximately 10 seconds. The mixture was collected and centrifuged as in Example 7. No pipeline 44 was used. The resulting egg yolk had a weight loss of 12% and cholesterol reduction of 75%.

It will be understood that the claims are intended to cover all changes and modifications of the preferred embodiments of the invention herein chosen for the purpose of illustration which do not constitute a departure from the spirit and scope of the invention.

What is claimed is:

1. A process for reducing cholesterol from egg yolk comprising the steps of:
   (a) forming a uniform liquid mixture comprising water, food grade base, cyclodextrin and egg yolk, at a temperature of about 20° C. to about 60° C., said base being present in an amount sufficient to adjust the pH of said mixture to between about 7.5 and 12, said cyclodextrin being present in an amount of about 10% to about 30% by weight water, and said mixture having a water to egg yolk weight ratio of about 0.7:1 to 2:1, such that complexes form between the cholesterol and said cyclodextrin;
   (b) separating said complexes from said mixture;
   (c) adjusting the pH of said solution to about 6 to about 7 by means of a food grade acid; and
   (d) recovering an egg yolk with reduced cholesterol.

2. The process of claim 1 wherein the mixture which is formed in step (a) has a temperature of about 55° C. and comprises enough base to adjust the pH of the solution to about 8.5 to about 9.5; cyclodextrin in an amount of about 10% to about 15% by weight water, and has a water to egg yolk weight ratio of about 1:1.

3. The process of claim 2 wherein said mixture is maintained for about 1 to about 60 minutes.

4. The process of claim 3 wherein the food grade acid is citric acid.

5. The process of claim 4 further comprising the steps of treating said recovered egg yolk with an immobilized alpha amylase enzyme and a combination of alpha amylase and cyclodextrin glucosyltransferase at a temperature of about 50° C. for a period of about 30 minutes to remove residual cyclodextrin from the egg yolk.

6. A process for reducing cholesterol in egg yolk comprising the steps of:
   (a) forming a mixture comprising water, potassium hydroxide and cyclodextrin, said potassium hydroxide being present in an amount of about 0.5% to about 0.75% by weight water in said mixture and said cyclodextrin being present in an amount of about 10% to about 30% by weight water;
   (b) heating said solution to a temperature of about 20° C. to about 60° C.;
   (c) heating egg yolk to a temperature of about 20° C. to about 60° C.;
   (d) forming a uniform liquid mixture comprising said heated egg yolk and said heated solution, said mixture having a water to egg yolk weight ratio of about 0.7:1 to about 2:1, and a pH of about 8.5 to about 10.5;
   (e) maintaining said mixture for a period of time of about 1 to about 60 minutes to form complexes between said cyclodextrin and said cholesterol;
   (f) separating said complexes from said mixture;
   (g) adjusting the pH of said mixture to about 6 to about 7 with a food grade acid; and
   (h) recovering said egg yolk having reduced cholesterol content.

7. The process of claim 6 wherein the solution comprises potassium hydroxide in an amount of 0.6% to about 0.7% by weight water and cyclodextrin in an amount of about 10% to about 15% by weight water.

8. The process of claim 6 wherein said solution is heated to a temperature of about 55° C. and said egg yolk is heated to a temperature of about 55° C.

9. The process of claim 6 wherein said mixture has a water to egg yolk weight ratio of about 1:1 and a pH of about 9 to about 10.

10. The process of claim 6 wherein said mixture is maintained for about 5 to about 10 minutes.

11. The process of claim 6 wherein said complex is separated from said mixture by means of centrifugation.

12. The process of claim 6 wherein the acid is citric acid.

13. The process of claim 6 wherein the recovered egg yolk is subjected to a further step of evaporating water to remove water from the egg yolk.

14. The process of claim 6 further comprising the step of treating said recovered egg yolk with an immobilized alpha amylase enzyme at a temperature of about 50° C. for a period of about 30 minutes, the weight ratio of recovered egg yolk to enzyme being about 10:1 to about 2:1 to reduce residual cyclodextrin in said recovered egg yolk; and then recovering said treated recovered egg yolk, said treated recovered egg yolk being substantially free of residual cyclodextrin.

15. The process of claim 6 further comprising the steps of suspending the separated complex in water such that the weight ratio of water to complex is about 99.1 to about 4:1; heating the suspended complex to a temperature of about 90° C. to about 100° C. for a period of about 5 to about 30 minutes to separate the cyclodextrin from the complex and subsequently recovering the cyclodextrin.

16. The process of claim 15 wherein the suspended complexes are heated to about 95° C. and the weight ratio of water to complex in the suspension is about 9:1.

17. The process of claim 6 wherein the cyclodextrin is beta-cyclodextrin.

18. The process of claim 6 wherein said egg yolk is present as whole egg.

19. The process of claim 6 further comprising the step of separating egg yolk from egg white and using the separated egg yolk in step (c).

20. The process of claim 4 further comprising the step of treating said recovered egg yolk with either an immobilized alpha amylase enzyme or a combination of alpha amylase and cyclodextrin glucosyltransferase at a temperature of about 50° C. for a period of about 30 minutes to remove residual cyclodextrin from the egg yolk.

* * * * *